US012626026B2

(12) United States Patent
Maung et al.

(10) Patent No.: US 12,626,026 B2
(45) Date of Patent: May 12, 2026

(54) METHODS AND APPARATUS TO PREVENT A FALSE DISCONNECTION IN UNIVERSAL SERIAL BUS DEVICES

(71) Applicant: Texas Instruments Incorporated, Dallas, TX (US)

(72) Inventors: Win Naing Maung, Plano, TX (US); Srijan Rastogi, Bangalore (IN); Bharath Singareddy, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 72 days.

(21) Appl. No.: 18/523,590

(22) Filed: Nov. 29, 2023

(65) Prior Publication Data
US 2025/0021704 A1      Jan. 16, 2025

Related U.S. Application Data

(60) Provisional application No. 63/525,734, filed on Jul. 10, 2023.

(51) Int. Cl.
*G06F 21/85*      (2013.01)
*G06F 13/42*      (2006.01)

(52) U.S. Cl.
CPC .......... *G06F 21/85* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 8,308,358 B2 * | 11/2012 | Doorenbos | .............. G01K 7/01 |
| | | | 374/170 |
| 8,963,607 B1 * | 2/2015 | Oswal | .................... H03K 5/003 |
| | | | 327/307 |
| 9,710,411 B2 | 7/2017 | Maung et al. | |

(Continued)

OTHER PUBLICATIONS

Compaq et al., "Universal Serial Bus Specification," Revision 2.0, Apr. 27, 2000, 805 pages.

(Continued)

*Primary Examiner* — Henry Tsai
*Assistant Examiner* — Christopher A Bartels
(74) *Attorney, Agent, or Firm* — Xianghui Huang; Frank D. Cimino

(57) ABSTRACT
Methods, apparatus, systems, and articles of manufacture are disclosed to prevent a false disconnection in universal serial bus devices. An example apparatus includes a comparator including a first input terminal, a second input terminal, and an output terminal, the first input terminal coupled to a first connectional terminal, the second input terminal coupled to a second connection terminal; filter circuitry including an input terminal and an output terminal, the input terminal coupled to the output terminal of the comparator; a switch including a control terminal, a first current terminal, and a second current terminal, the control terminal coupled to the output terminal of the filter circuitry; and a current source including a first terminal and a second terminal, the first terminal coupled to at least one of the first connection terminal or the second connection terminal, the second terminal coupled to the first current terminal of the switch.

20 Claims, 6 Drawing Sheets

(56) References Cited

U.S. PATENT DOCUMENTS

| | | | | |
|---|---|---|---|---|
| 11,923,084 | B2* | 3/2024 | Carroll | A61B 18/1206 |
| 2006/0075152 | A1* | 4/2006 | Zhu | G06F 13/4081 |
| | | | | 710/15 |
| 2012/0099367 | A1* | 4/2012 | Azuma | H10B 63/22 |
| | | | | 365/148 |
| 2014/0145504 | A1* | 5/2014 | Kayama | H02J 50/10 |
| | | | | 307/23 |
| 2014/0211862 | A1* | 7/2014 | Moghe | G06F 13/4072 |
| | | | | 375/256 |
| 2015/0035477 | A1* | 2/2015 | Wong | G06F 1/266 |
| | | | | 320/165 |
| 2016/0004661 | A1* | 1/2016 | Dixit | G06F 13/4221 |
| | | | | 710/106 |
| 2017/0344508 | A1* | 11/2017 | Setiawan | G06F 13/4022 |
| 2020/0186712 | A1* | 6/2020 | Högasten | H04N 25/673 |
| 2022/0027304 | A1 | 1/2022 | Muto | |
| 2022/0077783 | A1* | 3/2022 | Khamesra | H02M 1/0019 |
| 2022/0083112 | A1* | 3/2022 | Konduru | H02M 1/0019 |
| 2022/0350388 | A1* | 11/2022 | Lin | G06F 1/266 |
| 2023/0188037 | A1* | 6/2023 | Priego | H02M 1/14 |
| | | | | 323/272 |
| 2023/0237206 | A1* | 7/2023 | Weigand | G06F 21/81 |
| | | | | 726/34 |

OTHER PUBLICATIONS

Test USB, "High Speed Signal Quality," USB 2.0 Specification, Section 7.1.2.2, High Speed Eye, URL:[https://testusb.com/HSEYE. htm], 2018, 2 pages.
International Search Report for PCT/US2024/036333, dated Sep. 11, 2024.

* cited by examiner

METHODS AND APPARATUS TO PREVENT A FALSE DISCONNECTION IN UNIVERSAL SERIAL BUS DEVICES

CROSS-REFERENCE TO RELATED APPLICATION

This patent application claims the benefit of and priority to U.S. Provisional Patent Application No. 63/525,734, which was filed on Jul. 10, 2023, which is hereby incorporated herein by reference in its entirety.

TECHNICAL FIELD

This description relates generally to circuits, and, more particularly, to methods and apparatus to prevent a false disconnection in universal serial bus devices.

BACKGROUND

Universal Serial Bus (USB) devices communicate with each other via a wired connection using a USB protocol. For example, a host USB device may be connected to and/or communicate with a USB peripheral device. The host USB device (e.g., a computer) may include circuitry to determine when the USB peripheral device (e.g., a printer) has been disconnected from the host USB device. The circuitry may generate an alert and/or indication to a user when a USB peripheral device has disconnected from the host USB device.

SUMMARY

An example of the description includes an apparatus comprising a comparator including a first input terminal, a second input terminal, and an output terminal, the first input terminal of the comparator coupled to a first connectional terminal, the second input terminal coupled to a second connection terminal; filter circuitry including an input terminal and an output terminal, the input terminal of the filter circuitry coupled to the output terminal of the comparator; a switch including a control terminal, a first current terminal, and a second current terminal, the control terminal of the switch coupled to the output terminal of the filter circuitry, the second current terminal of the switch coupled to ground; and a current source including a first terminal and a second terminal, the first terminal of the current source coupled to at least one of the first connection terminal or the second connection terminal, the second terminal of the current source coupled to the first current terminal of the switch.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
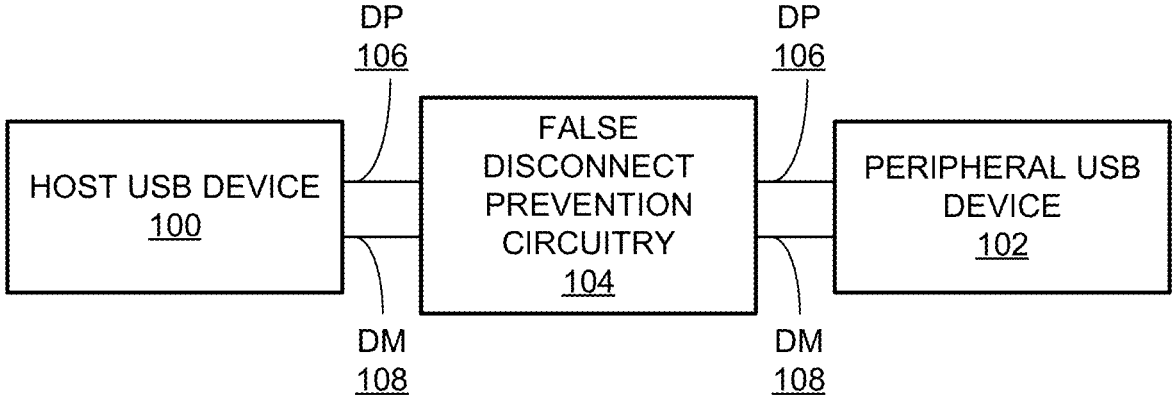
FIG. 1 is an example system to implement example false disconnection prevention circuitry in conjunction with two USB devices.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Universal Serial Bus (USB) devices connected together communicate with each other via a USB protocol. For example, a host USB device (e.g., implemented in a computer) can be connected to and communicate with a USB peripheral device (e.g., a keyboard, a mouse, a sensor, user interface, etc.) based on a USB protocol. In some examples, the host USB device can be connected to the USB peripheral device via a bus including a pair of connections (e.g., wires, cables, etc.) that make up a USB channel. The USB devices transmit and/or receive data using a differential signal that is transmitted via the pair of connections in a USB channel. For example, when two USB devices are connected via a USB channel, the impedance of the pair of connections corresponds to a first resistance. However, if one or both of the connections are disconnected, the impedance will increase, thereby causing the voltage differential (e.g., also referred to as voltage swing) between the two connection pairs to increase. Thus, some host USB devices include circuitry that monitors the voltage differential between the two connections in the pair to identify when the USB peripheral device has disconnected from the host USB device. For example, the host USB device may include an envelope detector to determine when the USB peripheral device has disconnected based on the voltage swing increasing above a threshold amount. The host USB device can perform one or more operations, including sending an alert to a user, when a disconnect is identified.

After connected, the USB devices can communicate with each other using data packets sent on the differential pair of connections. According to the USB protocol, some data packet transmissions end with an end-of-packet (EOP) message protocol by intentionally sending a byte including a particular data or bit pattern (e.g., "01111111").

High speed start of frame (SOF) packets also send data from the host USB device to the peripheral USB device. However, SOF packets have a different EOP protocol that is longer (e.g., extended) from non SOF packet EOP protocols. For example, the EOP protocol for high speed SOF packets is five bytes long (e.g., "01111111-11111111-11111111-1111111"). The EOP of the SOF packet is designed to allow the disconnection envelope detector of the host USB device enough time to detect a rise in the data swing of the differential connections in the event of a disconnect. Accordingly, some disconnection envelope detectors will only sample the differential connections during the SOF EOP to determine whether a disconnect occurred because the SOF EOP corresponds to outputting a high voltage, such as a high positive voltage or "1" and a high negative voltage or "−1", on the differential connections long enough to determine whether the voltage swing has raised enough to indicate a disconnect.

To transmit data on the differential connection of the USB channel, the host USB device outputs a direct current that corresponds to an output voltage (e.g., when the current passes through the resistance corresponding to the connection). However, because the cable, board, etch, connector, wire, etc. also has some impedance or DC resistance, the voltage differential seen at the peripheral USB device may be lower than desired. Accordingly, some host USB devices increase the direct current output on the differential connection to a higher direct current to increase the voltage differential seen at the peripheral USB device. The DC resistance of the USB channel depends on the characteristics of the channel, such as cable width, channel length, etc. However, increasing the DC current increases the voltage swing across the differential cables. Holding the differential voltage at the higher DC current can, with enough time, cause the voltage differential to exceed the threshold used to determine when a disconnect occurs. For example, because the SOF EOP protocol holds a high voltage differential for nearly 5 bytes, increasing the DC current can result in a false disconnection determination.

To avoid a false disconnection determination during SOF EOP, when the probability of false disconnection is highest, new USB devices have hardware and/or software that adjusts the threshold voltage used to detect disconnects to a higher voltage to avoid detection false disconnects when outputting higher DC currents. However, legacy devices that have already been hardwired, configured, structured and/or programmed to the previous, legacy threshold are still at risk of detecting false disconnects. Examples disclosed herein provide circuitry to determine when a SOF EOP protocol is occurring. In response to the SOF EOP determination, examples disclosed herein adjust (e.g., pulling down or pulling up) the voltage on one or more of the connections of the USB channel to avoid the voltage swing during SOF EOP rising to above the legacy threshold.

FIG. 1 illustrates an example system for preventing a false disconnection trigger for a legacy USB device. FIG. 1 includes an example host USB device 100, an example peripheral USB device 102, example false disconnect prevention circuitry 104, an example data plus (DP) connection 106, and an example data minus (DM) connection 108.

The host USB device 100 of FIG. 1 is a device that communicates with the peripheral USB device 102 using a USB protocol. The host USB device 100 initiates the communication on the bus or channel that includes the data connections 106, 108. The host USB device 100 may be circuitry that is included in a computing device, such as a computer, a server, a processing device, a television, a vehicle, a video game system, a control center, etc. The host USB device 100 includes circuitry, such as envelop detection circuitry, to compare the voltage swing corresponding to the voltage difference between the voltage on the data plus connection 106 and the data minus connection 108. In some examples, the host USB device 100 is a legacy device where the envelop detection circuitry utilizes a legacy threshold for determining when a USB device has been disconnected.

The peripheral USB device 102 of FIG. 1 is a device that communicates with the host USB device 100 using a USB protocol. The peripheral USB device 102 may be circuitry that is included in a computing device, a mouse, a keyboard, speakers, a sensor, a controller, and/or any other device that is capable of communicating via a USB channel. The USB peripheral device may transmit data to and/or receive data from the host USB device 100 via the example data plus connection 106 and the example data minus connection 108 of a USB channel.

The false disconnect prevention circuitry 104 of FIG. 1 is circuitry to prevent false disconnects during SOF EOP protocols. In some examples, the false disconnect prevention circuitry 104 is a standalone chip and/or integrated circuit. In some examples, the false disconnect prevention circuitry 104 is included within the host USB device 100 and/or the peripheral USB device 102. For example, the false disconnect prevention circuitry 104 may be coupled to the output terminals of the host USB device 100 within the device that implements the host USB device 100. Additionally or alternatively, the false disconnect prevention circuitry 104 may be coupled to the output terminals of the peripheral USB device 102 within the device that implements the peripheral USB device 102. The false disconnect prevention circuitry 104 determines when an extended EOP occurs, when the differential voltage between the DP connection 106 and the DM connection 108 is above a threshold for a threshold duration of time. After the extended EOP has been detected, the false disconnect prevention circuitry 104 decreases the voltage swing across the connections 106, 108 by pulling down the voltage on the DP connection 106 toward ground or pulling up the voltage on the DM connection 108 toward the ground (e.g., from a negative voltage). The false disconnection prevention circuitry 104 additionally determines when an extended EOP ends, when the threshold number of sequential '1's, logic high, or high voltage on the DP connection 106 ends, and/or when the threshold number of sequential'−1s', or high negative voltage output on the DM connection 108 ends. The false disconnection prevention circuitry 104 is further described below in conjunction with FIG. 2.

Figure 2:
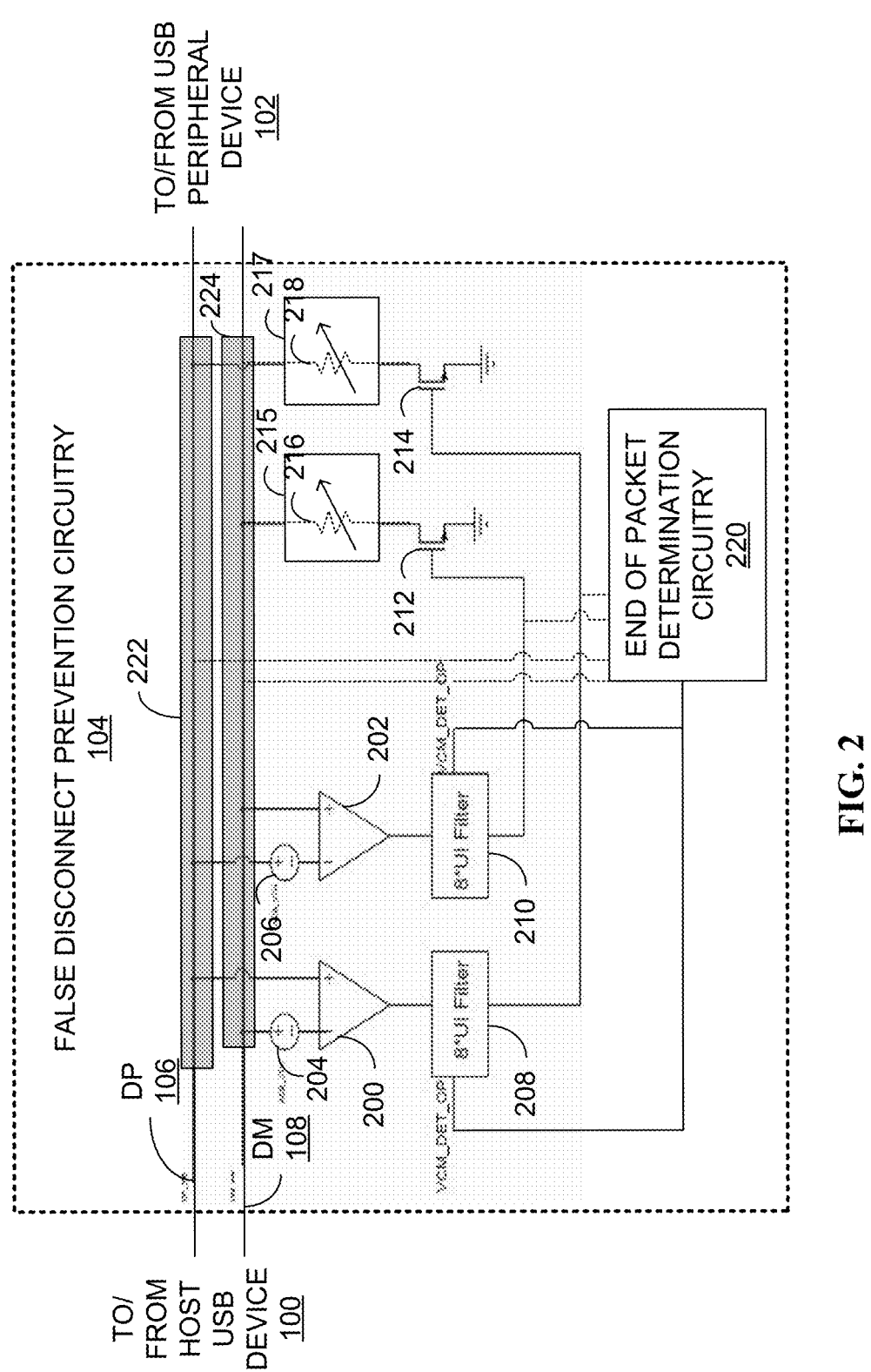
FIG. 2 is an example circuit implementation of the example false disconnection prevention circuitry of FIG. 1.

FIG. 2 illustrates an example circuitry implementation of the false disconnect prevention circuitry 104 of FIG. 1. FIG. 2 includes the example DP and DM connections 106, 108 of FIG. 1. The false disconnection prevention circuitry 104 of FIG. 2 includes example comparators 200, 202, example voltage sources 204 206, example filters 208, 210, example switches 212, 214, example current sources 215, 217, example resistors 216, 218, example end-of-packet determination circuitry 220, an example DP terminal 222, and an example DM terminal 224.

The comparator 200 of FIG. 2 compares the voltage differential between the DP connection 106 and the DM connection 108 after a threshold voltage is applied to the voltage on the DM connection 108. The comparator 200 includes an inverting input terminal, a non-inverting input terminal, and an output terminal. The inverting input terminal of the comparator 200 is coupled to the second terminal of the voltage source 204 (e.g., corresponding to a first threshold voltage Vth1). The non-inverting input terminal of the comparator 200 is structured to be coupled to the DP terminal 222 which is in connected to (e.g., in contact with, coupled to, etc.) the host USB device 100 and the peripheral USB device 102 via the DP connection 106. The output terminal of the comparator 200 is coupled to a first input terminal of the filter 208. The comparator 200 compares the voltage at the DP terminal 222/DP connection 106 to the voltage at the DM terminal 224/DM connection 108 adjusted by a threshold voltage (e.g., |DP−DM|−Vth1). In this manner, the comparator 200 can determine whether the voltage swing between the connections 106, 108 is above a threshold corresponding to a value of '1' being output on the DP connection 106 and a value of '1' being output on the DM connection 108. When the voltage swing is above the threshold, the comparator 200 outputs a first voltage (e.g., a high voltage or a logic '1') to the filter 208 to indicate that the voltage on the DP terminal 222/DP connection 106 corresponds to '1' and/or the voltage on the DM terminal 224/DM connection 108 corresponds to '−1.' When the voltage swing is below the threshold, the comparator 200 outputs a second voltage (e.g., a low voltage or a logic '0') to the filter 208 to indicate that the voltage on the DP connection 106 corresponds to '0' and/or the voltage on the DM connection 108 corresponds to '0.'

The comparator 202 of FIG. 2 compares the voltage differential between the DP connection 106 and the DM connection 108 after a threshold voltage is applied to the voltage on the DM connection 108. The comparator 202 includes an inverting input terminal, a non-inverting input terminal, and an output terminal. The inverting input terminal of the comparator 202 is coupled to the second terminal of the voltage source 206 (e.g., corresponding to a second threshold voltage Vth2). The non-inverting input terminal of the comparator 202 is coupled to the DM terminal 224 which is in contact with the host USB device 100 and the peripheral USB device 102 via the DM connection 108. The output terminal of the comparator 202 is coupled to a first input terminal of the filter 210. The comparator 202 compares the voltage at the DM terminal 224/DM connection 108 to the voltage at the DP terminal 222/DP connection 106 adjusted by a threshold voltage (e.g., |DP−DM|−Vth2). In this manner, the comparator 202 can determine whether the voltage swing between the connections 106, 108 is above a threshold corresponding to a value of '1' being output on the DP connection 106 and a value of '1' being output on the DM connection 108. When the voltage swing is above the threshold, the comparator 202 outputs a first voltage (e.g., a high positive voltage or a logic '1') to the filter 210 to indicate that the voltage on the DP connection 106 corresponds to '1' and/or the voltage on the DM connection 108 corresponds to '−1.' When the voltage swing is below the threshold, the comparator 202 outputs a second voltage (e.g., a low voltage or a logic '0') to the filter 210 to indicate that the voltage on the DP connection 106 corresponds to '0' and/or the voltage on the DM connection 108 corresponds to '0.'

The filter 208 of FIG. 2 enables and/or disables the switch 214 when the output of the comparator 200 corresponds to the first voltage for a threshold amount of time. The filter includes two input terminals and an output terminal. The first input terminal of the filter 208 is coupled to the output terminal of the comparator 200. The second input terminal of the filter 208 is coupled to the output terminal of the end-of-packet determination circuitry 220. The output terminal of the filter 208 is coupled to a control terminal of the switch 214. The filter 208 tracks an amount of time or number of bits sent to identify when a high voltage or '1' is output on the DP connection 106, based on the output of the comparator 200, for more than a threshold duration of time and/or for more than a threshold number of bits in a row. For example, because the probability of a false disconnect increases when the amount of time that the voltage that DP connection 106 is high increases, the filter 208 determines when a SOF EOP protocol is occurring. For example, a typical EOP protocol holds the voltages at the DP and DM connections 106, 108 high for 7 bits and the SOF EOP protocol holds the voltage at the DP connection 106 and/or the DM connection 108 high for 39-40 bits. Thus, the filter 208 determines, based on the output of the comparator 200, that SOF EOP protocol is occurring after the voltage differential between the DP connection 106 and the threshold adjusted DM connection 108 is above a threshold for more than 8 bits of data. After the filter 208 determines that the output of the comparator 200 corresponds to the first voltage for more than a threshold amount of time corresponding to the transmission of 8 bits of data, the filter 208 enables the switch 214 by outputting a voltage (e.g., a high voltage or 3.3 V) to the switch 214. The filter 208 disables the switch by outputting a second voltage (e.g., a low voltage or 0 V) to the switch 214 after receiving an indication from the end-of-packet determination circuitry 220 that the EOP protocol has ended.

The filter 210 of FIG. 2 enables and/or disables the switch 212 when the output of the comparator 202 corresponds to the first voltage for a threshold amount of time. The filter includes two input terminals and an output terminal. The first input terminal of the filter 210 is coupled to the output terminal of the comparator 202. The second input terminal of the filter 210 is coupled to the output terminal of the end-of-packet determination circuitry 220. The output terminal of the filter 210 is coupled to a control terminal of the switch 212. The filter 210 tracks an amount of time or number of bits sent to identify when a high negative voltage or '−1' is output on the DM connection 108, based on the output of the comparator 202, for more than a threshold duration of time and/or for more than a threshold number of bits in a row. For example, because the probability of a false disconnect increases when the amount of time that the voltage that DP connection 106 is high increases, the filter 210 determines when a SOF EOP protocol is occurring. For example, a typical EOP protocol holds the voltages at the DP and DM connections 106, 108 high for 7 bits and the SOF EOP protocol holds the voltage at the DP connection 106 and/or the DM connection 108 high for 39-40 bits. Thus, the filter 210 determines, based on the output of the comparator 202, that SOF EOP protocol is occurring after the voltage differential between the DP connection 106 and the threshold adjusted DM connection 108 is above a threshold for more than 8 bits of data. After the filter 210 determines that the output of the comparator 202 corresponds to the first voltage for more than a threshold amount of time corresponding to the transmission of 8 bits of data, the filter 210 enables the switch 212 by outputting a voltage (e.g., an enabled signal, a high voltage, 3.3 V, etc.) to the switch 212. The filter 210 disables the switch by outputting a second voltage (e.g., a disable signal, a low voltage, 0 V, etc.) to the switch 212 after receiving an indication from the end-of-packet determination circuitry 220 that the EOP protocol has ended.

In some examples, instead of utilizing two filters 208, 210, two comparators 200, 202, and two voltage sources 204, 206, one of the sets of each could be implemented and a single filter can control the gates of both switches 212, 214 using the same output terminal.

The switch 212 of FIG. 2, when enabled pulls current on the DP connection 106 down to ground to cause the voltage at the DM connection 108 to increase from the high negative voltage to a lower negative voltage based on the amount of resistance in the resistor 216. The switch 212 includes a control terminal (e.g., a gate terminal), a first current terminal (e.g., a drain terminal), and a second current terminal (e.g., a source terminal). The control terminal of the switch 212 is coupled to the output terminal of the filter 210. The first current terminal of the switch 212 is coupled to a second terminal of the resistor 216. The second current terminal of the switch 212 is coupled to ground. In the example of FIG. 2, the switch 212 is a transistor. In particular, the switch 212 is a N-channel metal oxide semiconductor transistor (NMOS). However, the switch 212 can be any type of transistor or switch. When enabled (e.g., when the voltage at the control terminal is a high voltage), the switch 212 creates a path from the DM connection 108 to ground via the resistor 216, thereby pulling the high negative voltage on the DM connection 108 up to a lower negative voltage. By pulling the voltage on the Dm connection 108 up, the voltage swing between the DP and DM connections 106, 108 is decreased to avoid the voltage swing increasing to a voltage above the legacy disconnect threshold. Accordingly, enabling the switch 212 prevents a false disconnect.

The switch 214 of FIG. 2, when enabled pulls current on the DP connection 106 down to ground to cause the voltage at the DP connection 106 to decrease from the high positive voltage to a lower positive voltage based on the amount of resistance in the resistor 218. The switch 214 includes a control terminal (e.g., a gate terminal), a first current terminal (e.g., a drain terminal), and a second current terminal (e.g., a source terminal). The control terminal of the switch 214 is coupled to the output terminal of the filter 208. The first current terminal of the switch 214 is coupled to a second terminal of the resistor 218. The second current terminal of the switch 214 is coupled to ground. In the example of FIG. 2, the switch 214 is a transistor. In particular, the switch 214 is a N-channel metal oxide semiconductor transistor (NMOS). However, the switch 214 can be any type of transistor or switch. When enabled (e.g., when the voltage at the control terminal is a high voltage), the switch 214 creates a path from the DP connection 106 to ground via the resistor 218, thereby pulling the high positive voltage on the DP connection 106 down to a lower positive voltage. By pulling the voltage on the DP connection 106 down, the voltage swing between the DP and DM connections 106, 108 is decreased to avoid the voltage swing increasing to a voltage above the legacy disconnect threshold. Accordingly, enabling the switch 214 prevents a false disconnect.

The current sources 215, 217 of FIG. 2 provide a path to ground for current to flow to/from when the respective switches 212, 214 are enabled. In the example of FIG. 2, the current sources 215, 217 are implemented by resistors (e.g., variable resistors). However, the current sources 215, 217 can be implemented by any current source circuitry. The current sources 215, 217 each include two terminals. The first terminal of the current source 215 is coupled to the DM terminal 224 which is in contact with the USB device 100 and/or the peripheral USB device 102 via the DM connection 108. The second terminal of the current source 215 is coupled to the first current terminal of the switch 212. The first terminal of the current terminal 217 is coupled to the DP connection 222 which is in contact with the USB device 100 and/or the peripheral USB device 102 via the DP connection 106. The second terminal of the current source 217 is coupled to the first current terminal of the switch 214. The resistance of the resistors 216, 218 are variable. The lower the resistance of the resistors 216, 218, when the respective switches 212, 214 are enabled, the more current that is drawn to/from ground. The resistance of the resistors 216, 218 can be adjusted to cause the voltage swing on the DP and DM connections 106, 108 to lower to a voltage that corresponds to a disconnect threshold (e.g., the disconnect threshold of a current USB standard). In this manner, although legacy host USB devices 100 may trigger a disconnect when the voltage swing across the connections 106, 108 reaches a legacy threshold, the false disconnection prevention circuitry 104 can adjust the voltage swing to avoid a false detection using the legacy threshold. Thus, even though the host USB device 100 is operating under the legacy disconnect threshold, the false disconnection prevention circuitry can adjust the voltages on the DP connection 106 and/or the DM connection 108 to cause the host USB device 100 to trigger disconnect indications based on the updated threshold, even though it is operating based on the legacy threshold. Likewise, when the current sources 215, 217 are implemented by different current source circuitry, the current sources 215, 217 can be adjusted to control the voltage swing between the DP and DM connections 106, 108.

The example end-of-packet determination circuitry 220 of FIG. 2 determines when the SOF EOP protocol ends to trigger the filters 208, 210 to disable the respective switches 212, 214. The end-of-packet determination circuitry 220 includes one terminal coupled to the filters 208, 210. In some examples, the end-of packet determination circuitry 220 includes two additional terminals (as shown in the dashed lines). In such examples, the first additional terminal of the end-of-packet determination circuitry 220 is coupled to the output terminal of the filter 208 and the second additional terminal of the end-of-packet determination circuitry 220 is coupled to the output terminal of the filter 210. In some examples, the end-of packet determination circuitry 220 includes two additional terminals (as shown in the dashed lines), as further described below in conjunction with FIG. 4. In such examples, the first additional terminal of the end-of-packet determination circuitry 220 is coupled to the DP terminal 222 which is in contact with the DP connection 106. Additionally, the second additional terminal of the end-of-packet determination circuitry 220 is coupled to the DM terminal 224 which is in contact with the DM connection 108.

In some examples, the end-of-packet determination circuitry 220 uses a counter (e.g., a digital counter) to track a number of unit instructions (UIs) after the output of the filter(s) 208, 210 indicates that an SOF EOP is occurring. As described above, the SOF has an extended EOP that lasts 39-40 bits or about 5 bytes long, for example. Although an extended EOP can last any number of bytes. A UI corresponds to the amount of time it takes to transmit one bit of information. Accordingly, for every bit of information transmitted on the DP and/or DM connections 106, 108, the counter 406 increments a count (e.g., a UI count). The counter 406 initiates a count after obtaining an indication from the filter(s) 208, 210 (e.g., via the output terminals of the corresponding filter(s) 208, 210) that an extended EOP is occurring. Thus, after obtaining an indication of an extended EOP from the filters 208, 210, the counter of the end-of-packet determination circuitry 220 increments and/or counts units of time (UI) corresponding to bits of information. After the count reaches a threshold number of UIs corresponding to the end of the extended EOP, the end-of-packet determination circuitry 220 can output a signal to filter(s) 208, 210 to disable the switch(es) 212, 214. For example, if an extended EOP is 5 bytes long, the end-of-packet determination circuit 220 can initiate a count after the first byte has ended (e.g., based on the output of the filter(s) 208, 210). When the count reaches 32 (e.g., corresponding to 32 UIs for 32 bits or 4 bytes), the end-of-packet determination circuitry 220 outputs an indication of the end of the extended EOP to the filter(s) 208, 210 to disable the switch(es) 212, 214. Additionally, after determining that the end of the extended EOP, the end-of-packet determination circuitry 220 resets the counter for a subsequent detection of a subsequent extended EOP protocol.

In some examples, the end-of-packet determination circuitry 220 can determine the EOP based on an average of the voltages on the DP and DM connections 106, 108. For example, when the SOF EOP protocol ends, the average of the voltages on the DP and DM connections 106, 108 will be higher than a threshold voltage. Accordingly, the end-of-packet determination circuitry 220 may determine that the EOP protocol is complete by comparing the average voltage of the DP and Dm connections 106, 108 to a threshold voltage. There may be other ways for the end-of-packet determination circuitry 220 to determine that an EOP protocol has completed. An example circuit implementation of the end-of-packet determination circuitry 220 is further described below in conjunction with FIG. 4.

The example DP and DM terminals 222, 224 of FIG. 2 are connection terminals, interfaces, connection points, etc. that are structured to contact, connection, and/or couple to the respective DP and DM connections 106, 108 between the host USB device 100 and the peripheral USB device 102. The DP and DM terminals 222, 224 allow the false disconnection prevention circuitry 104 to monitor and/or adjust the currents and/or voltages on the DP and DM connections 106, 108.

Figure 3:
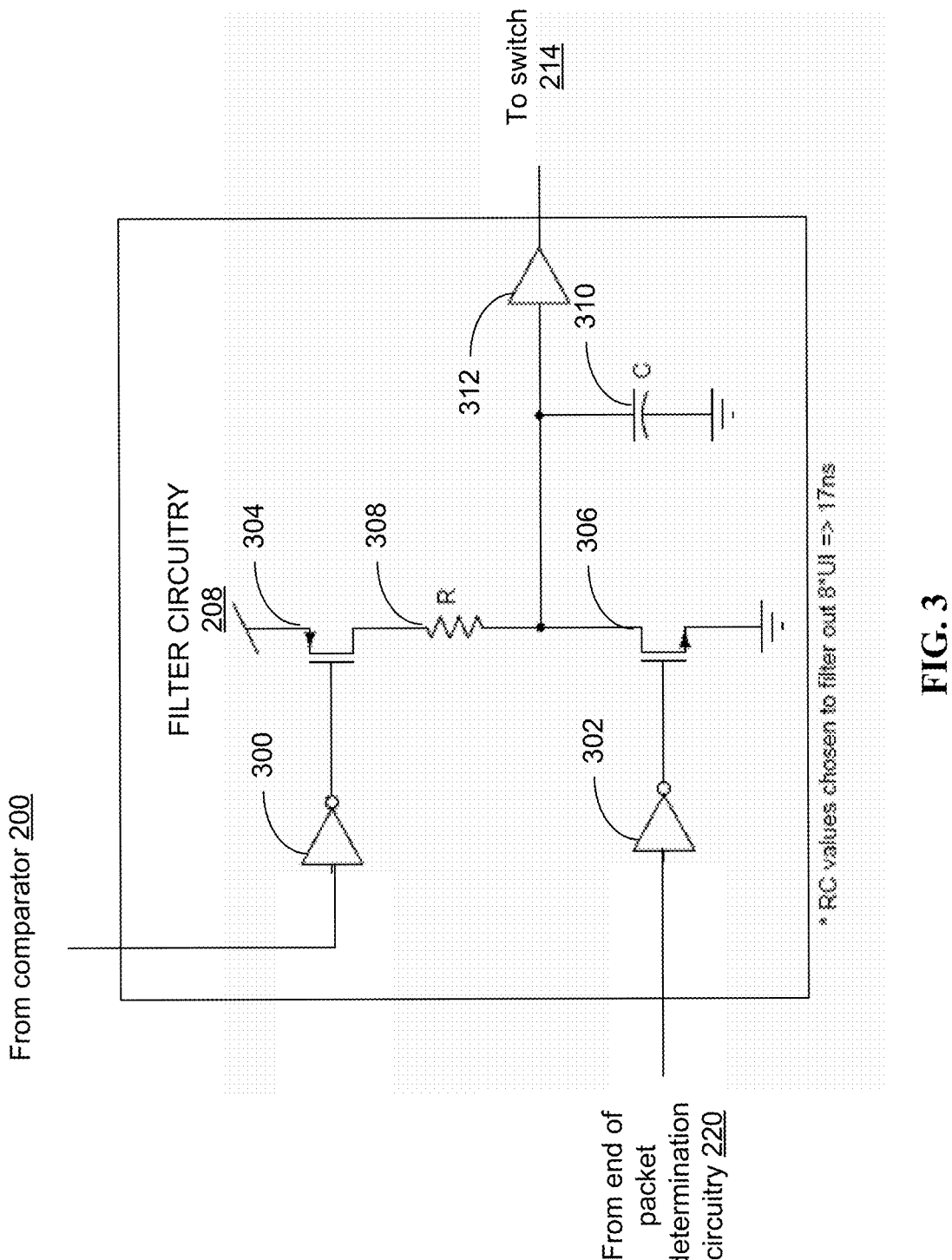
FIG. 3 is an example circuit implementation of the filter circuitry 208 of FIG. 2

FIG. 3 is a circuit implementation of the filter circuitry 208 of FIG. 2. Additionally, the circuitry of FIG. 3 may be used to implement the filter circuitry 210 of FIG. 2. The filter circuitry 208 includes example inverters 300, 302, example switches 304, 306, an example resistor 308, an example capacitor 310, and/or an example buffer 312.

The inverters 300, 302 of FIG. 3 generates an output signal by inverting an input signal (e.g., from a high voltage to a low voltage or from a low voltage to a high voltage). The inverters 300, 302 each include an input terminal and an output terminal. The input terminal of the inverter 300 is coupled to the comparator 200. The output terminal of the inverter 300 is coupled to a control terminal of the switch 304. The input terminal of the inverter 302 is coupled to the end of packet determination circuitry 220. The output terminal of the inverter 302 is coupled to a control terminal of the switch 306. Although the inverters 300, 302 are implemented to invert the output of the comparator 200 and/or the end of packet determination circuitry 220, the inverters 300, 302 could be replaced by buffers (e.g., and the switches 304, 306 can be replaced with other types of switches).

The example switch 304 of FIG. 3 is configured to be enabled when the output of the inverter 300 is a low voltage (e.g., when the output of the comparator 200 outputs a high voltage indicative of the voltage swing between the DP/DM connections 106, 108 being above a threshold). The switch 304 includes a control terminal, a first current terminal, and a second current terminal. The control terminal of the switch 304 is coupled to the output terminal of the inverter 300. The first current terminal of the switch 304 is coupled to a supply voltage terminal. The second current terminal of the switch 304 is coupled to a first terminal of the resistor 308. The switch 304 is a P-channel MOSFET transistor (PMOS). However, the switch 304 may be a NMOS transistor (e.g., when the inverter 300 is replaced as a buffer or if the input terminals of the comparator 200 are flipped) and/or any other switch. When enabled the switch 304 couples the supply voltage to the resistor 308. When disabled, the switch 304 decouples the supply voltage from the resistor 308. As described above, the comparator 200 outputs a high voltage when the voltage swing across the DP/DM connections 106, 108 is above a threshold. Thus, when the comparator 200 outputs a high voltage, a low voltage is applied to the switch 304 to enable the switch 304.

The example switch 306 of FIG. 3 is configured to be enabled when the output of the inverter 302 is a low voltage (e.g., when the output of the comparator end of packet determination circuitry 220 outputs a high voltage indicative of the end of an end of packet protocol. The switch 306 includes a control terminal, a first current terminal, and a second current terminal. The control terminal of the switch 306 is coupled to the output terminal of the inverter 302. The first current terminal of the switch 306 is coupled to a second terminal of the resistor 308, the first terminal of the capacitor 310 and the input terminal of the buffer 213. The second current terminal of the switch 306 is coupled to a ground terminal. The switch 306 is a NMOS. However, the switch 304 may be a PMOS transistor (e.g., when the inverter 300 is replaced as a buffer) and/or any other switch. When enabled the switch 306 couples the capacitor 310 to ground to discharge the voltage stored in the capacitor 310 at the input terminal of the buffer 312. When disabled, the switch 304 decouples the capacitor 310 supply voltage from the ground terminal via the switch 306. Thus, when the end of packet determination circuitry 220 outputs a voltage corresponding to the end of the end of packet protocol (e.g., when the common mode voltage does low), the output of the inverter 302 increases to a high voltage to enable the switch 306. Otherwise, the end of packet determination circuitry outputs a high voltage causing the output of the inverter 302 to output a low voltage to disable the switch 306.

The resistor 308 of FIG. 3 includes a first terminal and a second terminal. The first terminal of the resistor 308 is coupled to the second current terminal of the switch 304. The second terminal of the resistor 308 is coupled to the first current terminal of the switch 306, the first terminal of the capacitor 310, and an input terminal of the buffer 312. The capacitor 310 includes of a first terminal and a second terminal. The first terminal of the capacitor 310 is coupled to the second terminal of the resistor 308, the first current terminal of the switch 306, and the input terminal of the buffer 312. The second terminal of the capacitor 310 is coupled to ground. The resistor 308 and capacitor 310 create a filter that filters out a threshold number of UIs. A UI corresponds to the amount of time it takes to transmit one bit of information. For example, if the filter 208 is structured to output a high voltage after 8 bits of information (e.g., which takes approximately 17 nanoseconds), the resistance of the resistor 308 and/or the capacitance of the capacitor 310 can be selected so that the voltage at the input terminal of the buffer 312 is high enough to trigger the buffer 312 to output a high voltage after 8 UI. For example, when the switch 304 is enabled and the switch 306 is disabled, the supply voltage begins to charge the capacitor 310 to increase the voltage at the input terminal of the buffer 312. When the capacitor 310 charges to a threshold voltage of the buffer 312, the buffer 312 outputs a high voltage. Accordingly, the resistor 308 and/or the capacitor 310 can be selected to cause the capacitor 310 to charge at a rate that causes the voltage at the input terminal of the buffer 312 reaches the threshold voltage at of the buffer 312. Additionally, as described above, when the end-of-packet determination circuitry 220 outputs a low signal, the switch 306 enables to discharge the capacitor 310, thereby lowering the voltage at the input terminal of the buffer 312.

The buffer 312 of FIG. 3 outputs a high voltage when an input voltage reaches a threshold voltage. The buffer 312 includes an input terminal and an output terminal. The input terminal of the buffer 312 is coupled to the second terminal of the resistor 308, the first current terminal of the switch 306, and the first terminal of the capacitor 310. The output terminal of the buffer 312 is coupled to the control terminal of the switch 214. The buffer 312 outputs a low voltage when the voltage at the input terminal of the buffer 312 is below a threshold (e.g., 0.7 Volts (V)) and outputs a high voltage when the voltage at the input terminal of the buffer 312 is above the threshold.

Figure 4:
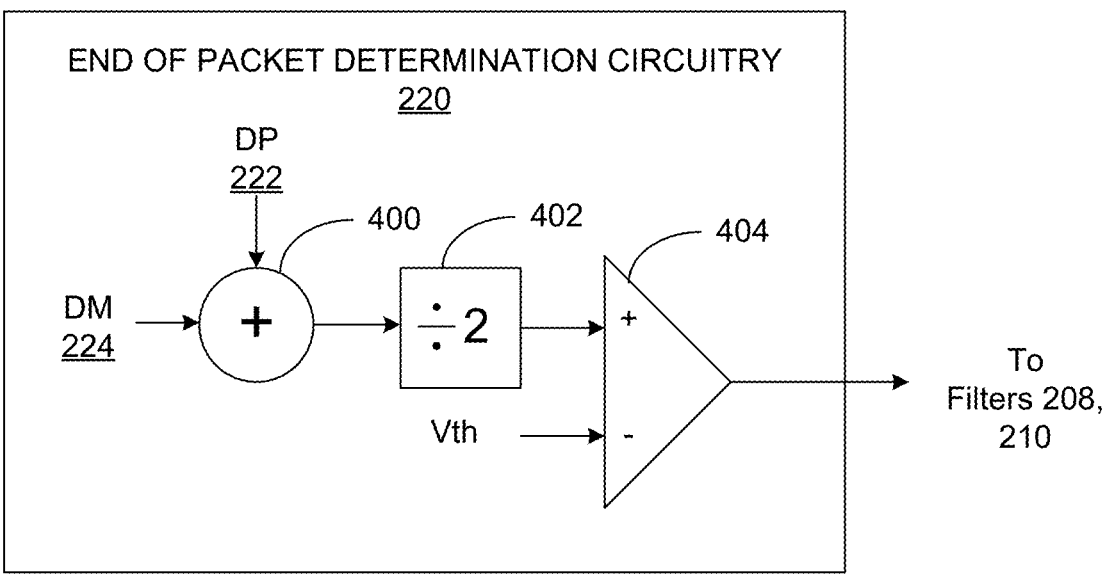
FIG. 4 is an example circuit implementation of example end-of-packet determination circuitry of FIG. 2.

FIG. 4 is a circuit implementation of the end-of-packet determination circuitry 220 of FIG. 2. The example end-of-packet determination circuitry 220 of FIG. 2 includes example summing circuitry 400, example division circuitry 402, and an example comparator 404. As described above, the end-of-packet determination circuitry 220 can determine that an SOF EOP protocol is complete by comparing the average voltage between the DP and DM connections 106, 108 to a threshold voltage. Accordingly, the end-of-packet determination circuitry 220 determines the average voltage between the DP and DM connections 106, 108 and compares the average to a threshold.

The example summing circuitry 400 of FIG. 4 sums the voltages at the DP connection 106 and the DM connection 108. The summing circuitry 400 includes a first input terminal, a second input terminal, and an output terminal. The first input terminal of the summing circuitry 400 is coupled to the DP terminal 222 which is in contact with the host USB device 100 and the peripheral USB device 102 via the DP connection 106. The second input terminal of the summing circuitry 400 is coupled to the DM terminal 224 which is in contact with the host USB device 100 and the peripheral USB device 102 via the DM connection 108. The output terminal of the summing circuitry 400 is coupled to an input terminal of the division circuitry 402. The summing circuitry 400 sums the voltages at the DP connection 106 and the DM connection 108 and outputs the sum to the division circuitry 402 via the output terminal of the summing circuitry 400.

The example division circuitry 402 of FIG. 4 divides the obtained sum of the voltages at the DP connection 106 and the DM connection 108 by two. The division circuitry 402 includes an input terminal and an output terminal. The input terminal of the division circuitry 402 is coupled to the output terminal of the summing circuitry 400. The output terminal of the division circuitry 402 is coupled to a first input terminal of the comparator 404. The division circuitry 402 outputs the result (e.g., the average of the voltages at the DP and DM connections 106, 108) to the comparator 404.

The example comparator 404 of FIG. 4 compares the average voltage of the DP and DM connections 106, 108 to a threshold voltage (Vth). The comparator 404 includes a first non-inverting input terminal, a second inverting input terminal, and an output terminal. The first input terminal of the comparator 404 is coupled to the output terminal of the division circuitry 402. The second input terminal of the comparator 404 is coupled to a voltage source that outputs a threshold voltage. The output terminal of the comparator 404 is coupled to the second input terminals of the filters 208, 210. The comparator 404 outputs a first voltage (e.g., a high voltage) when the voltage at the first input terminal is higher than the voltage at the second input terminal. As described above, the voltage at the first input terminal corresponds to the average voltage of the DP and DM connections 106, 108 and the voltage at the second input terminal corresponds to a threshold voltage. The comparator 404 outputs a second voltage (e.g., a low voltage) when the voltage at the first input terminal is lower than the voltage at the second input terminal. In this manner, the comparator 404 can indicate to the filters 208, 210 that the SOF EOP protocol is complete when the output of the comparator 404 is the first voltage.

Figure 5:
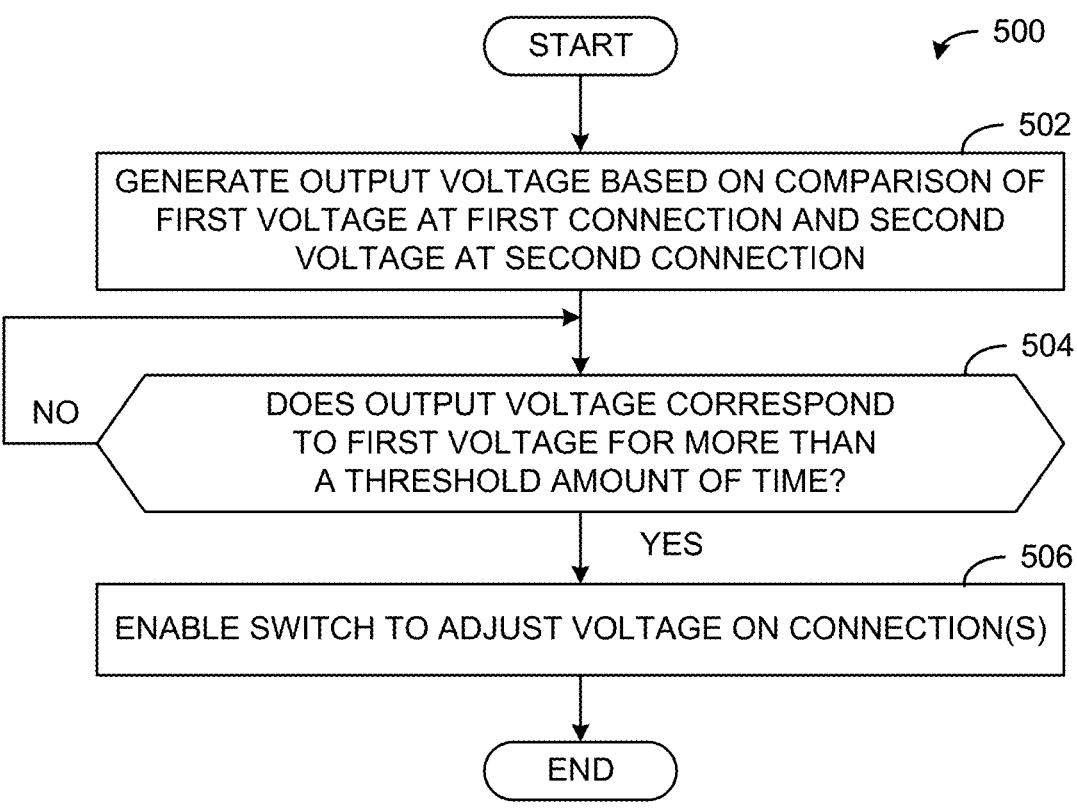
FIG. 5 is a flowchart representative of a method and/or operations that may be executed to implement the false disconnect prevention circuitry of FIG. 2.

FIG. 5 is a flowchart representative of a method and/or example operations 500 that may be executed and/or instantiated by processor circuitry and/or any other circuitry of the false disconnection prevention circuitry 104 of FIGS. 1-2 to prevent false disconnects in legacy USB devices. Although the instructions and/or operations of FIG. 5 are described in conjunction with the false disconnection prevention circuitry 104 of FIGS. 1-2, the instructions and/or operations may be described in conjunction with any type of device that identifies device disconnects.

The machine-readable instructions and/or the operations 500 of FIG. 5 begin at block 502, at which one or more of the comparators 200, 202 generate(s) an output voltage based on the comparison of a first voltage at the DP terminal 222/DP connection 106 and a second voltage at the DM terminal 224/DM connection 108. As described above in conjunction with FIG. 2, the DM connection 108 is adjusted by the voltage source 204 corresponding to a threshold voltage for the comparator 200 and the DP connection 106 is adjusted by the voltage source 206 corresponding to a threshold voltage for the comparator 202. The output voltage may be a first voltage (e.g., a high voltage) when the voltage differential between the connections 106, 108 is above a threshold (e.g., corresponding to one or more of the voltage sources 204, 206) and output a second voltage (e.g., a low voltage) when the voltage differential between the connections 106, 108 is below the threshold.

At block 504, the one or more filters 208, 210 determines if the output voltage corresponds to a first voltage for more than a threshold amount of time. For example, an extended EOP protocol causes a high positive voltage to be applied to the DP connection 106 and a high negative voltage to be applied to the DM connection 108 for 39-40 UIs. Accordingly, the one or more filters 208, 210 determines if an extended EOP protocol is occurring when the output of the one or more comparators 200, 202 corresponds to a high voltage for more than 8 UIs. If the one or more filters(s) determines that the output voltage does not correspond to a first voltage for more than a threshold amount of time (block 504: NO), control returns to block 504 until the output voltage corresponds to the first voltage for more than a threshold amount of time. If the one or more filters(s) determines that the output voltage corresponds to a first voltage for more than a threshold amount of time (block 504: YES), control continues to block 506. At block 506, the filter 208 outputs a voltage to enable the switch 214 and/or the filter 210 outputs a voltage to enable the switch 212 to adjust the voltage on the connection(s) 106, 108. For example, when enabled, the switches 212, 214 provide a path to ground to pull down the voltage on the DP connection 106 to a lower positive voltage and/or pull up the voltage on the DM connection 108 to a lower negative voltage. By adjusting the voltages, the voltage swing between the DP connection 106 and the DM connection 108 is lowered to avoid triggering a false disconnection indication in legacy devices.

Figure 6:
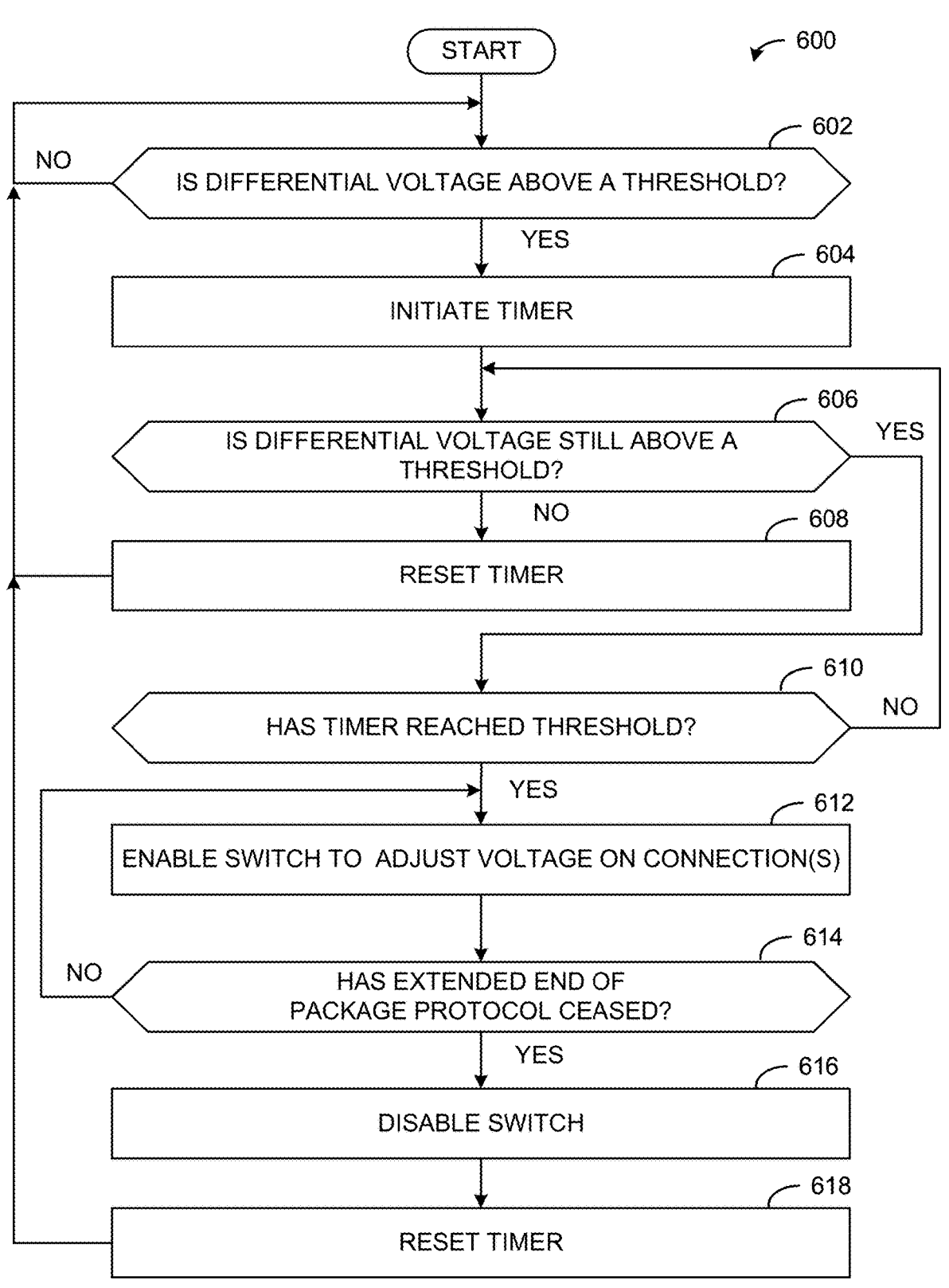
FIG. 6 is a flowchart representative of a method and/or operations that may be executed to implement the false disconnect prevention circuitry of FIG. 2.

FIG. 6 is a flowchart representative of a method and/or example operations 600 that may be executed and/or instantiated by processor circuitry and/or any other circuitry of the false disconnection prevention circuitry 104 of FIGS. 1-2 to prevent false disconnects in legacy USB devices. Although the instructions and/or operations of FIG. 6 are described in conjunction with the false disconnection prevention circuitry 104 of FIGS. 1-2, the instructions and/or operations may be described in conjunction with any type of device that identifies device disconnects.

The machine-readable instructions and/or the operations 600 of FIG. 6 begin at block 602, at which one or more of the filters 208, 210 determines if a differential voltage between the DP connection 106 and the DM connection 108 is above a threshold. For example, the one or more filters 208, 210 determines if the differential voltage is above the threshold based on the output of the corresponding comparator 200, 202. As described above, the comparators 200, 202 generate(s) an output voltage based on the comparison of a first voltage at the DP connection 106 and a second voltage at the DM connection 108. The DM connection 108 is adjusted by the voltage source 204 corresponding to a threshold voltage for the comparator 200 and the DP connection 106 is adjusted by the voltage source 206 corresponding to a threshold voltage for the comparator 202. The output voltage may be a first voltage (e.g., a high voltage) when the voltage differential between the connections 106, 108 is above a threshold (e.g., corresponding to one or more of the voltage sources 204, 206) and output a second voltage (e.g., a low voltage) when the voltage differential between the connections 106, 108 is below the threshold. Thus, the one or more filters 208, 210 determines if the differential voltage is above a threshold based on the output voltage of the corresponding comparator 200, 200.

If the one or more filters 208, 210 determines that the differential voltage is not above a threshold (block 602: NO), control returns to block 602 until the voltage differential voltage is above the threshold. If the one or more filters 208, 210 determines that the differential voltage is above a threshold (block 602: YES), control continue to block 604. At block 604, the corresponding filter(s) 208, 210 initiate a timer and/or counter. As described above, the an extended EOP correlates to a risk of a false indication of a disconnect. Additionally, an extended EOP results in the differential voltage being above a threshold for more than a threshold amount of time, corresponding to 8 UI, for example. Thus, the filter(s) 208, 210 initiate a timer and/or counter to determine if an extended EOP is occurring based on the voltage differential being above the threshold for more than the threshold amount of time. In some examples, the filter(s) 208, 210 may initiate a counter that counts UIs.

At block 606, the example filter(s) 208, 210 determine(s) if the differential voltage is still above the threshold. If the example filter(s) 208, 210 determine(s) that the differential voltage is not still above the threshold (block 606: NO), control continues to block 608. At block 608, the filter(s) 208, 210 resets the timer and control returns to block 602. If the filter(s) 208, 210 determines that the differential voltage is still above the threshold (block 606: YES), control continues to block 610. At block 610, the filter(s) 208, 210 determines if the timer has reached a threshold amount of time. Additionally or alternatively, the filter(s) 208, 210 may reset the count when the filter(s) 208, 210 implements a counter. If the filter(s) 208, 210 determines that the timer has not reached the threshold (block 610: NO), control returns to block 606. If the filter(s) 208, 210 determines that the timer has reached the threshold (block 610: YES), control continues to block 612. At block 612, the filter 208 outputs a voltage to enable the switch 214 and/or the filter 210 outputs a voltage to enable the switch 212 to adjust the voltage on the connection(s) 106, 108. For example, when enabled, the switches 212, 214 provide a path to ground to pull down the voltage on the DP connection 106 to a lower positive voltage and/or pull up the voltage on the DM connection 108 to a lower negative voltage. By adjusting the voltages, the voltage swing between the DP connection 106 and the DM connection 108 is lowered to avoid triggering a false disconnection indication in legacy devices.

At block 614, the end-of-packet determination circuitry 220 determines if the extended EOP protocol has ended. As described above, the end-of-packet determination circuitry

220 may determine that the extended EOP duration has ended based on a timing circuitry that tracks an amount of time corresponding to when the EOP ends and/or based on a comparison of the average voltage of the DP an DM connections 106, 108 to a threshold voltage. If the end-of-packet determination circuitry 220 determines that the extended EOP protocol has not ceased (block 614: NO), control returns to block 612. If the end-of-packet determination circuitry 220 determines that the extended EOP protocol has ceased (block 614: YES), control continues to block 616. At block 616, the example filter 208, 210 disables the corresponding switch(es) 212, 214. For example, the filter 208, 210 may output a second voltage (e.g., a low voltage) to cause the switches 212, 214 to operate as an open circuit to prevent a connection from the DP connection 106 and/or DM connection 108 to ground via the resistor(s) 216, 218. At block 618, the example filter(s) 208, 210 reset(s) the timer and control returns to block 602.

An example manner of implementing the false disconnect prevention circuitry 104 of FIG. 1 is illustrated in FIG. 2. However, one or more of the elements, processes and/or devices illustrated in FIG. 2 may be combined, divided, re-arranged, omitted, eliminated and/or implemented in any other way.

Further, the comparators 200, 202, the filters 208, 210, and/or the end-of-packet determination circuitry 220 of FIG. 2 may be implemented by hardware, software, firmware and/or any combination of hardware, software and/or firmware. As a result, for example, any of the comparators 200, 202, the filters 208, 210, and/or the end-of-packet determination circuitry 220 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the comparators 200, 202, the filters 208, 210, and/or the end-of-packet determination circuitry 220 of FIG. 2 is/are hereby expressly defined to include a non-transitory computer readable storage device or storage disk such as a memory, a digital versatile disk (DVD), a compact disk (CD), a Blu-ray disk, etc., including the software and/or firmware. Further still, the comparators 200, 202, the filters 208, 210, and/or the end-of-packet determination circuitry 220 of FIG. 2 may include one or more elements, processes and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather also includes selective communication at periodic intervals, scheduled intervals, aperiodic intervals, and/or one-time events.

Flowcharts representative of example hardware logic, machine-readable instructions, hardware implemented state machines, and/or any combination thereof for implementing the false disconnect prevention circuitry 104 of FIGS. 1-4 are shown in FIGS. 5-6. The machine-readable instructions may be one or more executable programs or portion(s) of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the entire program and/or parts thereof could alternatively be executed by a device other than the processor and/or embodied in firmware or dedicated hardware.

Further, although the example program is described with reference to the flowchart illustrated in FIGS. 5-6, many other methods of implementing the false disconnect prevention circuitry 104 may alternatively be used. For example, the order of execution of the blocks may be changed, and/or some of the blocks described may be changed, eliminated, or combined. Also or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, in which the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. As a result, the described machine-readable instructions and/or corresponding program(s) encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 8 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

Descriptors "first," "second," "third," etc. are used herein when identifying multiple elements or components which may be referred to separately. Unless otherwise specified or known based on their context of use, such descriptors do not impute any meaning of priority, physical order, or arrangement in a list, or ordering in time but are merely used as labels for referring to multiple elements or components separately for ease of understanding the described examples. In some examples, the descriptor "first" may be used to refer to an element in the detailed description, while the same element may be referred to in a claim with a different descriptor such as "second" or "third." In such instances, such descriptors are used merely for case of referencing multiple elements or components.

In the description and in the claims, the terms "including" and "having" and variants thereof are to be inclusive in a manner similar to the term "comprising" unless otherwise noted. Unless otherwise stated, "about," "approximately," or "substantially" preceding a value means +/−10 percent of the stated value. In another example, "about," "approximately," or "substantially" preceding a value means +/−5 percent of the stated value. IN another example, "about," "approximately," or "substantially" preceding a value means +/−1 percent of the stated value.

The term "couple", "coupled", "couples", and variants thereof, as used herein, may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. Moreover, the terms "couple", "coupled", "couples", or variants thereof, includes an indirect or direct electrical or mechanical connection.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Although not all separately labeled in the FIGS. 1-4, components or elements of systems and circuits illustrated therein have one or more conductors or terminus that allow signals into and/or out of the components or elements. The conductors or terminus (or parts thereof) may be referred to herein as pins, pads, terminals (including input terminals, output terminals, reference terminals, and ground terminals, for instance), inputs, outputs, nodes, and interconnects.

As used herein, a "terminal" of a component, device, system, circuit, integrated circuit, or other electronic or semiconductor component, generally refers to a conductor such as a wire, trace, pin, pad, or other connector or interconnect that enables the component, device, system, etc., to electrically and/or mechanically connect to another component, device, system, etc. A terminal may be used, for instance, to receive or provide analog or digital electrical signals (or simply signals) or to electrically connect to a common or ground reference. Accordingly, an input terminal or input is used to receive a signal from another component, device, system, etc. An output terminal or output is used to provide a signal to another component, device, system, etc. Other terminals may be used to connect to a common, ground, or voltage reference, e.g., a reference terminal or ground terminal. A terminal of an IC or a PCB may also be referred to as a pin (a longitudinal conductor) or a pad (a planar conductor). A node refers to a point of connection or interconnection of two or more terminals. An example number of terminals and nodes may be shown. However, depending on a particular circuit or system topology, there may be more or fewer terminals and nodes. However, in some instances, "terminal", "node", "interconnect", "pad", and "pin" may be used interchangeably.

Example methods, apparatus, systems, and articles of manufacture corresponding to prevent a false disconnection in universal serial bus devices are described herein. Further examples and combinations thereof include the following:

Example 1 includes an apparatus comprising a comparator including a first input terminal, a second input terminal, and an output terminal, the first input terminal of the comparator coupled to a first connectional terminal, the second input terminal coupled to a second connection terminal, filter circuitry including an input terminal and an output terminal, the input terminal of the filter circuitry coupled to the output terminal of the comparator, a switch including a control terminal, a first current terminal, and a second current terminal, the control terminal of the switch coupled to the output terminal of the filter circuitry, the second current terminal of the switch coupled to ground, and a current source including a first terminal and a second terminal, the first terminal of the current source coupled to at least one of the first connection terminal or the second connection terminal, the second terminal of the current source coupled to the first current terminal of the switch.

Example 2 includes the apparatus of example 1, wherein the first and second connection terminals are structured to be coupled to a channel between a first USB device and a second USB device.

Example 3 includes the apparatus of example 2, wherein the first USB device is a host USB device and the second USB device is a peripheral USB device.

Example 4 includes the apparatus of example 1, wherein the current source is a resistor.

Example 5 includes the apparatus of example 1, wherein the switch is a transistor.

Example 6 includes the apparatus of example 1, further including a voltage source, the first input terminal of the comparator coupled to the first connection terminal via the voltage source.

Example 7 includes the apparatus of example 1, wherein the input terminal of the filter circuitry is a first input terminal, further including end-of-packet determination circuitry including an output terminal, the output terminal of the end-of-packet determination circuitry coupled to a second input terminal of the filter circuitry.

Example 8 includes the apparatus of example 7, wherein the comparator is a first comparator, the end-of-packet determination circuitry including summing circuitry including a first input terminal, a second input terminal, and an output terminal, the first input terminal of the summing circuitry coupled to the first connection terminal, the second input terminal of the summing circuitry coupled to the second connection terminal, division circuitry including an input terminal and an output terminal, the input terminal of the division circuitry coupled to the output terminal of the summing circuitry, and a second comparator including a first input terminal, a second input terminal, and an output terminal, the first input terminal of the second comparator coupled to the output terminal of the division circuitry, the second input terminal of the second comparator coupled to a voltage source, and the output terminal of the second comparator coupled to the second input terminal of the filter circuitry.

Example 9 includes the apparatus of example 7, wherein the comparator is a first comparator, the end-of-packet determination circuitry including counter circuitry including an input terminal and an output terminal, the input terminal coupled to the output terminal of the filter circuitry, and a second comparator including a first input terminal, a second input terminal, and an output terminal, the first input terminal of the second comparator coupled to the output terminal of the counter circuitry, the second input terminal of the second comparator coupled to a voltage source, and the output terminal of the second comparator coupled to the second input terminal of the filter circuitry.

Example 10 includes an apparatus comprising a comparator including a first input terminal, a second input terminal, and an output terminal, the first input terminal of the comparator coupled to a first connectional terminal, the second input terminal coupled to a second connection terminal, the first connection terminal and the second connection terminal structured to be coupled to a first universal serial bus (USB) device and a second USB device, a switch including a control terminal, a first current terminal, and a second current terminal, the control terminal of the switch coupled to the output terminal of the comparator, the second current terminal of the switch coupled to ground, and a current source including a first terminal and a second terminal, the first terminal of the current source coupled to at least one of the first connection terminal or the second connection terminal, the second terminal of the current source coupled to the first current terminal of the switch.

Example 11 includes the apparatus of example 10, wherein the first USB device is a host USB device and the second USB device is a peripheral USB device.

Example 12 includes the apparatus of example 10, wherein the current source is a resistor.

Example 13 includes the apparatus of example 10, wherein the switch is a transistor.

Example 14 includes the apparatus of example 10, further including a voltage source, the first input terminal of the comparator coupled to the first connection terminal via the voltage source.

Example 15 includes the apparatus of example 10, further including filter circuitry including an input terminal and an output terminal, the control terminal of the switch coupled to the output terminal of the comparator via the filter circuitry.

Example 16 includes the apparatus of example 15, wherein the input terminal of the filter circuitry is a first input terminal, further including end-of-packet determination circuitry including an output terminal, the output terminal of the end-of-packet determination circuitry coupled to a second input terminal of the filter circuitry.

Example 17 includes the apparatus of example 16, wherein the comparator is a first comparator, the end-of-packet determination circuitry including summing circuitry including a first input terminal, a second input terminal, and an output terminal, the first input terminal of the summing circuitry coupled to the first connection terminal, the second input terminal of the summing circuitry coupled to the second connection terminal, division circuitry including an input terminal and an output terminal, the input terminal of the division circuitry coupled to the output terminal of the summing circuitry, and a second comparator including a first input terminal, a second input terminal, and an output terminal, the first input terminal of the second comparator coupled to the output terminal of the division circuitry, the second input terminal of the second comparator coupled to a voltage source, and the output terminal of the second comparator coupled to the second input terminal of the filter circuitry.

Example 18 includes the apparatus of example 16, wherein the comparator is a first comparator, the end-of-packet determination circuitry including counter circuitry including an input terminal and an output terminal, the input terminal coupled to the output terminal of the filter circuitry, and a second comparator including a first input terminal, a second input terminal, and an output terminal, the first input terminal of the second comparator coupled to the output terminal of the counter circuitry, the second input terminal of the second comparator coupled to a voltage source, and the output terminal of the second comparator coupled to the second input terminal of the filter circuitry.

Example 19 includes a system comprising a universal serial bus (USB) device including a first terminal and a second terminal, the first terminal structured to be coupled to a second USB device via a first interface of a bus, the second terminal structured to be coupled to the second USB device via a second interface of the bus, and false disconnection prevention circuitry configured to generate an output voltage based on a comparison a first voltage corresponding to the first terminal to a second voltage corresponding to the second terminal, and when the output voltage corresponds to a third voltage for a threshold duration of time, adjust the first voltage.

Example 20 includes the system of example 19, wherein the first voltage is adjusted using a threshold voltage.

Example 21 includes the system of example 19, wherein the false disconnection prevention circuitry is configured to initiate a timer when the output voltage is the first voltage, and adjust the output voltage after the timer reaches the threshold duration of time.

Modifications are possible in the described embodiments, and other embodiments are possible, within the scope of the claims.

What is claimed is:

1. An apparatus comprising:
a first comparator including a first input terminal, a second input terminal, and an output terminal, the first input terminal of the first comparator coupled to a first connection terminal, the second input terminal of the first comparator coupled to a second connection terminal;
averaging circuitry including a first input terminal, a second input terminal, and an output terminal, the first input terminal of the averaging circuitry coupled to the first connection terminal, the second input terminal of the averaging circuitry coupled to the second connection terminal;
a second comparator including a first input terminal, a second input terminal, and an output terminal, the first input terminal of the second comparator coupled to the output terminal of the averaging circuitry, the second input terminal of the second comparator coupled to a threshold voltage terminal;
filter circuitry including a first input terminal, a second input terminal, and an output terminal, the first input terminal of the filter circuitry coupled to the output terminal of the first comparator, the second input terminal of the filter circuitry coupled to the output terminal of the second comparator;
a transistor including a control terminal, a first current terminal, and a second current terminal, the control terminal of the transistor coupled to the output terminal of the filter circuitry, the first current terminal of the transistor coupled to the first connection terminal, the second current terminal of the transistor coupled to a ground terminal; and
a resistor coupling the first connection terminal to the first current terminal of the transistor.

2. The apparatus of claim 1, wherein the first and second connection terminals are structured to be coupled to a channel between a first Universal Serial Bus (USB) device and a second USB device.

3. The apparatus of claim 2, wherein the first USB device is a host USB device and the second USB device is a peripheral USB device.

4. The apparatus of claim 1, further including a voltage source, the first input terminal of the first comparator coupled to the first connection terminal via the voltage source.

5. The apparatus of claim 1, the averaging circuitry including:
summing circuitry including a first input terminal, a second input terminal, and an output terminal, the first input terminal of the summing circuitry coupled to the first connection terminal, the second input terminal of the summing circuitry coupled to the second connection terminal; and
division circuitry including an input terminal and an output terminal, the input terminal of the division circuitry coupled to the output terminal of the summing circuitry, the output terminal of the division circuitry coupled to the first input terminal of the second comparator.

6. The apparatus of claim 1, wherein the resistor is a first resistor, and the transistor is a first transistor, the filter circuitry including:
inverter circuitry including an input terminal and an output terminal, the input terminal of the inverter circuitry coupled to the output terminal of the first comparator;

a second transistor including a control terminal, a first current terminal, and a second current terminal, the control terminal coupled to the output terminal of the inverter circuitry, the first current terminal coupled to a supply voltage terminal;

a second resistor including a first terminal and a second terminal, the first terminal of the second resistor coupled to the second current terminal of the second transistor;

a capacitor including a first terminal and a second terminal, the first terminal of the capacitor coupled to the second terminal of the second resistor, the second terminal of the capacitor coupled to ground; and a buffer including an input terminal and an output terminal, the input terminal of the buffer coupled to the second terminal of the second resistor and the first terminal of the capacitor, the output terminal of the buffer coupled to the control terminal of the first transistor.

7. The apparatus of claim 1, wherein the filter circuitry is first filter circuitry, the transistor is a first transistor, and the resistor is a first resistor, the apparatus further comprising:

a third comparator including a first input terminal, a second input terminal, and an output terminal, the first input terminal of the third comparator coupled to the second connection terminal, the second input terminal of the third comparator coupled to the first connection terminal;

second filter circuitry including an input terminal and an output terminal, the first input terminal of the second filter circuitry coupled to the output terminal of the third comparator;

a second transistor including a control terminal, a first current terminal, and a second current terminal, the control terminal of the second transistor coupled to the output terminal of the second filter circuitry, the first current terminal of the second transistor coupled to the second connection terminal, the second current terminal of the second transistor coupled to a ground terminal; and a second resistor coupling the second connection terminal to the first current terminal of the second transistor.

8. The apparatus of claim 7, further comprising:

a first voltage source coupling the second input terminal of the first comparator to the second connection terminal; and a second voltage source coupling the second input terminal of the third comparator to the first connection terminal.

9. The apparatus of claim 7, wherein the input terminal of the second filter circuitry is a first input terminal of the second filter circuitry, the second filter circuitry further including a second input terminal coupled to the output terminal of the second comparator.

10. An apparatus comprising:

a comparator including a first input terminal, a second input terminal, and an output terminal, the first input terminal of the comparator coupled to a first connection terminal, the second input terminal of the comparator coupled to a second connection terminal, the first connection terminal and the second connection terminal structured to be coupled to a first universal serial bus (USB) device and a second USB device;

a first transistor including a control terminal, a first current terminal, and a second current terminal, the control terminal of the first transistor coupled to the output terminal of the comparator, the first current terminal of the first transistor coupled to a supply voltage terminal;

a capacitor including a first terminal and a second terminal, the first terminal of the capacitor coupled to the second current terminal of the first transistor, the second terminal of the capacitor coupled to ground;

a buffer including an input terminal and an output terminal, the input terminal of the buffer coupled to the second current terminal of the first transistor and the first terminal of the capacitor;

a first resistor coupling the second current terminal of the first transistor to the first terminal of the capacitor and the input terminal of the buffer;

a second transistor including a control terminal, a first current terminal, and a second current terminal, the control terminal of the second transistor coupled to the output terminal of the buffer, the first current terminal of the second transistor coupled to the first connection terminal, the second current terminal of the second transistor coupled to a ground terminal; and a second resistor coupling the first connection terminal to the first current terminal of the second transistor.

11. The apparatus of claim 10, wherein the first USB device is a host USB device and the second USB device is a peripheral USB device.

12. The apparatus of claim 10, further including a voltage source, the first input terminal of the comparator coupled to the first connection terminal via the voltage source.

13. The apparatus of claim 10, further comprising:

a third transistor including a control terminal, a first current terminal, and a second current terminal, the first current terminal of the third transistor coupled to the second current terminal of the first transistor, the first terminal of the capacitor, and the input terminal of the buffer, the second current terminal of the third transistor coupled to ground; and end-of-packet determination circuitry including an output terminal, the output terminal of the end-of-packet determination circuitry coupled to the control terminal of the third transistor.

14. The apparatus of claim 13, wherein the comparator is a first comparator, the end-of-packet determination circuitry including:

summing circuitry including a first input terminal, a second input terminal, and an output terminal, the first input terminal of the summing circuitry coupled to the first connection terminal, the second input terminal of the summing circuitry coupled to the second connection terminal;

division circuitry including an input terminal and an output terminal, the input terminal of the division circuitry coupled to the output terminal of the summing circuitry; and a second comparator including a first input terminal, a second input terminal, and an output terminal, the first input terminal of the second comparator coupled to the output terminal of the division circuitry, the second input terminal of the second comparator coupled to a voltage source, and the output terminal of the second comparator coupled to the control terminal of the third transistor.

15. The apparatus of claim 13, the end-of-packet determination circuitry including an input terminal coupled to the output terminal of the buffer and the control terminal of the second transistor.

16. A system comprising:

a universal serial bus (USB) device including a first terminal and a second terminal, the first terminal structured to be coupled to a second USB device via a first interface of a bus, the second terminal structured to be coupled to the second USB device via a second interface of the bus; and false disconnection prevention circuitry configured to:

generate a third voltage in response to a difference between a first voltage corresponding to the first terminal and a second voltage corresponding to the second terminal being greater than a threshold voltage;

initiate a timer in response to the third voltage being generated; and enable a transistor to adjust the first voltage in response to the timer reaching a threshold duration of time.

17. The system of claim 16, wherein the first voltage is adjusted using the threshold voltage.

18. The system of claim 16, the false disconnection prevention circuitry further configured to:

generate a fourth voltage in response to the difference between the first voltage and the second voltage being less than the threshold voltage; and reset the timer in response to the fourth voltage being generated.

19. The system of claim 16, the threshold voltage being a first threshold voltage, the false disconnection prevention circuitry further configured to:

determine an average of the first voltage and the second voltage in response to the transistor being enabled;

compare the average of the first voltage and the second voltage to a second threshold voltage; and disable the transistor in response to the average of the first voltage and the second voltage being greater than the second threshold voltage.

20. The system of claim 16, the false disconnection prevention circuitry further configured to:

initiate a counter in response to the transistor being enabled; and disable the transistor in response to the counter reaching a threshold count.

\* \* \* \* \*